United States Patent Office 3,641,086
Patented Feb. 8, 1972

3,641,086
PROCESS FOR CONVERTING TRIALKYL ALUMINUMS TO ALUMINUM ALKOXIDES
Russell G. Hay, Gibsonia, and John G. McNulty and William L. Walsh, Glenshaw, Pa., assignors to Gulf Research & Development Company, Pittsburgh, Pa.
No Drawing. Filed Nov. 17, 1969, Ser. No. 877,422
Int. Cl. C07f 5/06
U.S. Cl. 260—448 AD                     10 Claims

ABSTRACT OF THE DISCLOSURE

A process for converting a trialkylaluminum compound to an aluminum alkoxide while inhibiting the formation of hydrocarbons which involves oxidizing the trialkylaluminum compound and adding a secondary alcohol to the reaction mixture during the latter stages of oxidation.

---

This invention relates to a process for converting a trialkylaluminum to an aluminum alkoxide particularly to such process wherein the formation of hydrocarbon is inhibited.

Trialkylaluminum compounds are old and well known and can be obtained in a number of conventional ways. For example, a mixture of trialkylaluminum compounds, wherein the individual alkyl substituents, the same or different, have from two to forty carbon atoms preferably from two to 30 carbon atoms, can be obtained by heating triethylaluminum with ethylene under telomerization conditions, including a temperature of about 100° to about 180° C., preferably from about 120° to about 150° C., and a pressure of about 2000 to about 4000 pounds per square inch gauge, preferably from about 2500 to about 3000 pounds per square inch gauge, for about 15 to about 120 minutes, preferably for about 30 to about 60 minutes.

The mixture so obtained, or any portion thereof, can be converted by conventional oxidation procedures to the corresponding aluminum trialkoxides. Thus, a mixture of trialkylaluminum growth product, or any portion thereof, or even triethylaluminum itself, can be subjected to oxidation with molecular oxygen, for example, oxygen itself, in an amount stoichiometrically sufficient to convert the same to the corresponding aluminum trialkoxide under suitable conditions of temperature of about $-10°$ to about 120° C., preferably about 30° to about 45° C., pressure of about atmospheric to about 100 pounds per square inch gauge, preferably about atmospheric to about 20 pounds per square inch gauge, and a reaction time of about one-third to about five hours, preferably about one-half to about two hours. The aluminum trialkoxides thus obtained can then be subjected, for example, to conventional aqueous hydrolysis conditions to convert the same to alcohols corresponding to the alkoxide portion thereof and to an aluminum compound, such as aluminum hydroxide. Conditions of hydrolysis can include treating the oxidized product with an aqueous medium containing from about five to about 80 percent by weight, preferably from about 10 to about 30 percent by weight, of a strong acid, such as HCl or $H_2SO_4$, at a temperature of about 0° to about 50° C., preferably about 20° C. to about 35° C. and a pressure of about atmospheric to about 50 pounds per square inch gauge, preferably about atmospheric to about 20 pounds per square inch gauge.

Unfortunately during the oxidation of the trialkyl-aluminum to the aluminum trialkoxide relatively large amounts of hydrocarbons and lesser amounts of alcohols and aldehydes are formed. As long as a relatively small number of alkyl substituents are converted to alkoxides, relatively small amounts of hydrocarbons are formed. As the oxidation of alkyl groups proceeds to the point wherein substantially all of the alkyl groups are converted to alkoxides, the amount of hydrocarbon produced is greatly increased. Since the hydrocarbon so produced is of little or no value and must be removed from the reaction product, it would be economically attractive to reduce the amount thereof produced. Thus, to the extent hydrocarbons are produced instead of alkoxides and conversion of alcohols from the latter is desired, to the same extent the yield of alcohol is reduced.

We have found, however, that if a secondary alcohol is added to the oxidation during the last stages thereof, that is, when at least about 85 percent of the alkyl substituents have been converted, preferably when at least about 90 percent of the same have been converted, and especially when about 95 percent of the alkyl substituents have been converted, the amount of undesired by-product hydrocarbon formed is appreciably reduced. The hydrocarbons produced are believed to be ethane, butane, hexane, octane, decane, dodecane, tetradecane, hexadecane, eicosane, triacontane, tetracontane, etc. having from two to 40 carbon atoms.

The improvement herein accordingly involves adding a secondary alcohol to the oxidation mixture at the desired level of conversion of trialkylaluminum. Examples of secondary alcohols that can be used are those having from three to eight carbon atoms, preferably from three to six carbon atoms, such as isopropanol, isobutanol, 2-pentanol, 3-hexanol, 2-heptanol, 3-octanol. Of these we prefer to use isopropanol. The amount of secondary alcohol employed must be at least about three percent by weight, based on the trialkylaluminum charge, and while amounts in excess thereof can be used, in general about ten to about 20 percent by weight of secondary alcohol will suffice. To facilitate the operation an inert hydrocarbon solvent, such as normal butane, normal hexane, normal pentane, normal octane, etc., is used, the amount thereof being, for example, from about 20 to about 80, preferably from about 30 to about 60 percent by weight based upon the trialkylaluminum compound. The conditions of oxidation are as noted hereinabove. At the end of the oxidation the oxidized product will contain lesser amounts of hydrocarbons. If desired, the oxidized product can be subjected to distillation, for example, at a temperature of about 10° to about 200° C., preferably about 50° to about 150° C. and a pressure of about 760 to about one millimeters of mercury, preferably about 500 to about one millimeters of mercury, to remove hydrocarbons, alcohols and/or aldehydes present, leaving behind the desired aluminum trialkoxides, which can, for example, be subjected to hydrolysis to convert the same to desired alcohols.

The process can further be illustrated by the following.

To a three-necked, three-liter, stirred Morton flask there was charged a trialkylaluminum growth product wherein the alkyl groups had from two to 40 carbon atoms and 38 weight percent thereof of heptane. The trialkyl aluminum growth product was obtained from a continuously operated 11,018 milliliter tube reactor (one-half inch diameter and 257 feet in length) submerged in an oil bath at 230° F. The charge consisting of 54.7 weight percent ethylene, 11.59 weight percent triethylaluminum and 33.94 weight percent heptane was fed at a rate of 8.039 pounds per hour per cubic foot of reactor. Reactor pressure was maintained at 3500 pounds per square inch gauge. The residence time was two and one-half to three hours and gave a trialkylaluminum product wherein the alkyl substituents had from two to 40 carbon atoms, with the average alkyl having 12 carbon atoms. Ethylene conversion was 80.9 percent, giving a productivity of 3.5426 pounds of ethylene converted per hour per cubic foot of reactor. A series of runs was made wherein air or oxygen was introduced into the flask at a rate of 25 grams per hour, sufficient to maintain atmospheric conditions therein and to obtain the desired oxidation. The runs were carried out with and without $FeCl_3$ as an oxidation catalyst and with and without a secondary alcohol. At the end of the reaction the product was analyzed for its hydrocarbon content. Substantially all of the remainder was aluminum trialkoxide, for relatively small amounts of by-product alcohols and aldehydes were formed. The results obtained are tabulated below in Table I.

TABLE I

| Run No. | Oxidation | | | Percent by weight of— | | Mol percent of alkyl groups converted | Percent by weight of saturated Hydrocarbon formed [b] |
|---|---|---|---|---|---|---|---|
| | Time, hours | Gas used | Temperature, °C. | $FeCl_3$ [a] | Isopropanol [a] | | |
| 1 | 1 | Air | 42 | | | 22.0 | 0 |
| | 2 | $O_2$ | 43 | | | 56.0 | 0.3 |
| | 2 | $O_2$ | 50 | 0.5 | | 100 | 9.0 |
| 2 | 1 | Air | 45 | | | | |
| | 2 | $O_2$ | 45 | | | 64.3 | |
| | ¼ | $O_2$ | 33 | 0.5 | | 95 | |
| | ¾ | $O_2$ | 31 | 0.5 | 15.3 | 100 | 1.78 |
| 3 | ½ | $O_2$ | 40 | 0.5 | | 93.8 | |
| | ⅚ | $O_2$ | 30 | 0.5 | 15.7 | 100 | 4.33 |
| 4 | ½ | $O_2$ | 10–15 | 0.5 | | 88.8 | |
| | ¾ | $O_2$ | 15 | 0.5 | 13.6 | 100 | 5.44 |
| 5 | 1 | Air | 45 | | | | |
| | 1 | $O_2$ | 45 | | | 55.5 | |
| | 2 | $O_2$ | 45 | 0.5 | | 80.2 | |
| | 2 | $O_2$ | 45 | 0.5 | 14.4 | 100 | 15.7 |

[a] Based on trialkyl aluminium charge.
[b] Based on the total product.

The advantages of operating in accordance with our process is obvious from a study of the data in Table I. Thus, in Run No. 1 at the end of the first hour and using air as oxidant, 22.0 percent of the alkyl substituents on the trialkylaluminum charge were converted with no formation of hydrocarbons. Continued operation over the next two hours, with oxygen replacing air, resulted in a conversion of 56.0 percent and the formation of but 0.3 percent by weight of hydrocarbon. Operation was continued for two additional hours with 0.5 percent by weight of $FeCl_3$ as an oxidation catalyst, resulting in 100 percent conversion of alkyl substituents but with the formation of 9.0 percent by weight of hydrocarbon. In Run No. 2 oxidation was effected with air for one hour, with oxygen, in place of air, for an additional two hours and additionally with 0.5 percent by weight of $FeCl_3$ during the last hour. During the last ¾ of an hour, however, 15.3 percent by weight of isopropanol was also present. The amount of hydrocarbon present in the oxidation product was reduced to 1.78 percent. In Run No. 3 the addition of isopropanol during the last ⅚ of the hour of operation produced the same effect. Apparently the time of addition of isopropanol in Run No. 3 was slightly too soon, when compared with Run No. 2, but yet a desired reduction in undesired hydrocarbon was effected. To much the same effect as Run No. 3 is Run No. 4, in that it shows that the addition of isopropanol is desirably made as close as possible to about 95 percent conversion of alkyl groups. That it is critical that the isopropanol be added at a selected conversion level is apparent from Run No. 5 wherein the same was added at the 80.2 percent conversion level. Note, however, that such addition resulted in the formation of 15.7 percent by weight of hydrocarbons, far in excess of the amount obtained in Run No. 1 wherein no isopropanol was added to the reaction mixture.

Obviously, many modifications and variations of the invention, as hereinabove set forth, can be made without departing from the spirit and scope thereof, and therefore only such limitations should be imposed as are indicated in the appended claims.

We claim:
1. In a process wherein a trialkylaluminum product is subjected to oxidation to convert said trialkylaluminum product to an aluminum alkoxide product, the improvement which comprises adding a secondary alcohol and $FeCl_3$ to the oxidation mixture prior to the conversion of all of the alkyl substituents on the trialkylaluminum but when at least about 85 percent of the alkyl substituents have been converted, the amount of said secondary alcohol being at least about three percent by weight based on the trialkylaluminum charge and said $FeCl_3$ is about 0.5 percent by weight based on the trialkylaluminum charge, whereby hydrocarbon formation during said oxidation is inhibited.

2. The process of claim 1 wherein addition of secondary alcohol and $FeCl_3$ is effected prior to conversion of all of said alkyl substituents but when at least about 90 percent of the alkyl substituents have been converted.

3. The process of claim 1 wherein addition of secondary alcohol and $FeCl_3$ is effected prior to conversion of all of said alkyl substituents but when about 95 percent of the alkyl substituents have been converted.

4. The process of claim 1 wherein said secondary alcohol has from three to eight carbon atoms.

5. The process of claim 1 wherein said secondary alcohol has from three to six carbon atoms.

6. The process of claim 1 wherein said secondary alcohol is isopropanol.

7. The process of claim 1 wherein the amount of said secondary alcohol is from about 10 to about 20 percent by weight based on the trialkyl aluminum charge and said $FeCl_3$ is about 0.5 percent by weight thereof.

8. The process of claim 1 wherein the trialkylaluminum charge is obtained from the telomerization of triethylaluminum with ethylene.

9. The process of claim 1 wherein the individual alkyl groups on the trialkylaluminum charge have from two to 40 carbon atoms.

10. The process of claim 1 wherein the individual alkyl groups on the trialkylaluminum charge have from two to 30 carbon atoms.

References Cited

UNITED STATES PATENTS 3,450,735   6/1969   Lundeen et al.   260—448 AO

TOBIAS E. LEVOW, Primary Examiner

H. M. S. SNEED, Assistant Examiner